United States Patent Office 2,714,751
Patented Aug. 9, 1955

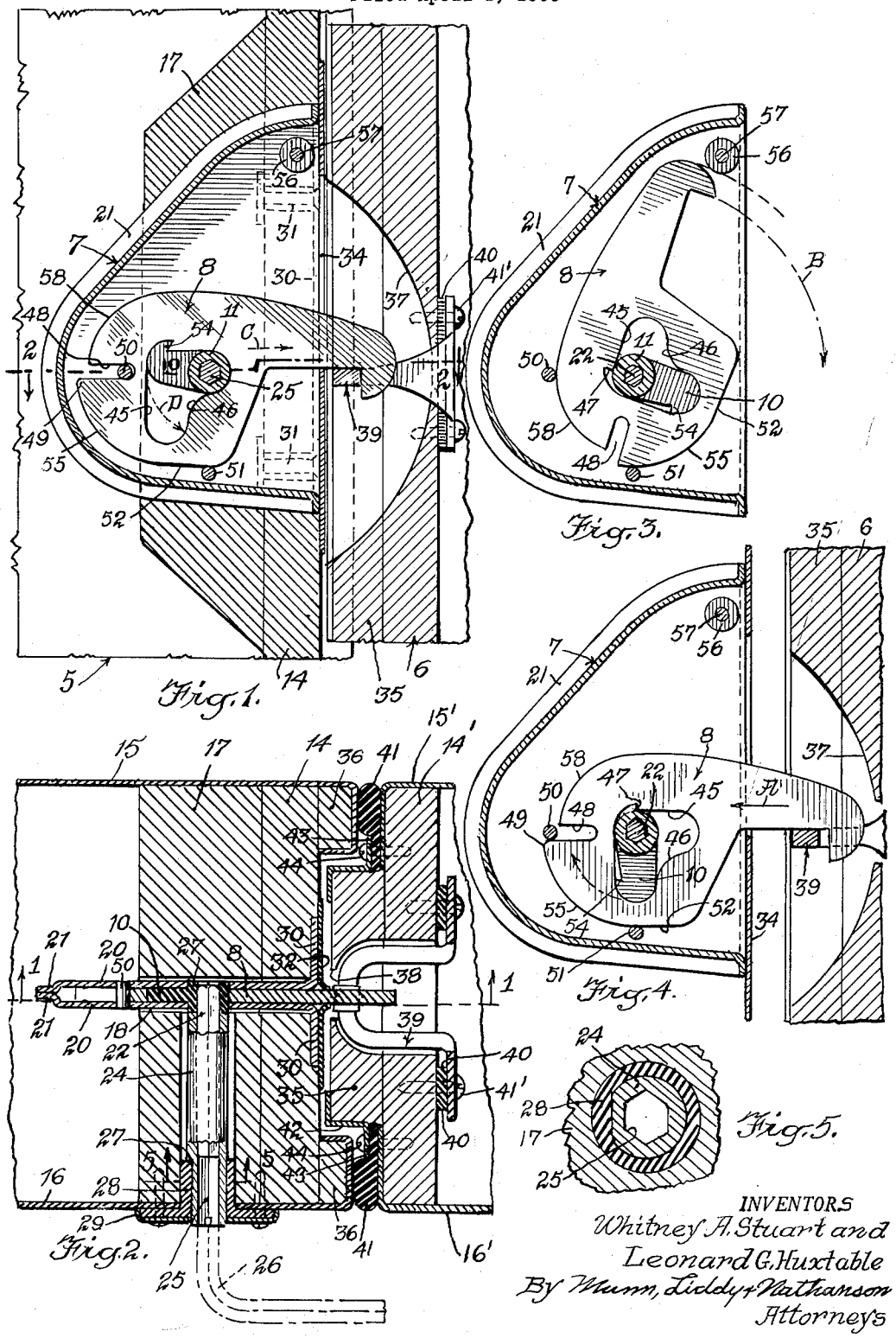

2,714,751

FASTENER

Whitney A. Stuart, Piscataway Township, Middlesex County, N. J., and Leonard G. Huxtable, New York, N. Y., assignors to Egmont Arens, New York, N. Y.

Application April 1, 1953, Serial No. 346,184

6 Claims. (Cl. 20—92)

This invention relates to fasteners adapted generally for use in securing together various types of building units, and especially adapted for use in securing together such units as are known as prefabricated panels designed to be so assembled as to form the walls of a refrigerator.

An important object of the invention is to provide a simple, effective, reliable, efficient, and relatively inexpensive fastener by which various types of building units to be assembled may be drawn into an intimate assembled relation to each other and there securely locked so as to lend rigidity, security, and stability to the completed structure.

A further object of the invention is to provide a fastener, which is of such character that it may be easily operated to facilitate rapid assembly of the building units in their intended relation to each other and also of such character that it may be operated with equal ease to facilitate rapid release of the units, as when it becomes desirable to knock down the assembly preparatory to transporting it from one location to another.

To the above and other ends, the invention contemplates for use with a pair of panels, a keeper secured to one of said panels, a locking hook carried by the other of said panels and adapted to be moved, from an inactive position into interlocking engagement with said keeper, while being first restricted to rotary displacement about a definite pivot point and thereafter restricted to displacement longitudinally of itself, there being provided rotatable actuating means associated with said hook for rotatably displacing that hook, on the one hand, and for longitudinally displacing the same, on the other hand, when carrying out the panel-locking operation, the hook and the hook-actuating means being so related to each other that the hook is effectively maintained in its locking position pursuant to the completion of the locking operation and until such time as the hook-actuating means is operated to so release the panels as to permit them to be separated in the event it becomes necessary or desirable to knock down the assembly.

Other objects and advantages of the invention will become apparent from the following description when taken in connection with the accompanying drawings, in which—

Figure 1 is a vertical, central, sectional view taken substantially on line 1—1 of Fig. 2 and showing the locking hook, which is associated with one panel, in locking engagement with its cooperatively associated keeper, carried by the other panel, the hook being shown retracted and the two panels being illustrated as drawn into intimate relation to each other.

Fig. 2 is a fragmental sectional view taken substantially on line 2—2 of Fig. 1.

Fig. 3 is a view similar to that of Fig. 1 and showing the locking hook in its released position, the two panels of Fig. 1 being omitted in this view.

Fig. 4 is a view similar to that of Fig. 1, one of the panels being omitted and the locking hook being illustrated as having been moved into locking engagement with its associated keeper preparatory to its being retracted to its locking position shown in Fig. 1, and Fig. 5 is a sectional view taken substantially on line 5—5 of Fig. 2.

The fastener herein illustrated as employed to lock a pair of adjacent panels 5 and 6 in an edge-to-edge or abutting relation, includes essentially a housing 7, a locking hook 8 movably supported within the housing and actuating means by which the locking hook may be rotated and also displaced longitudinally of itself, as and for the purpose hereinafter more particularly described, the actuating means including a translating finger 10, carried by a socket-like hub 11 journaled in the side walls of the housing and adapted for the reception of one end of a hexagonal or other multi-faced rod, hereinafter more particularly described and by which the finger 10 may be so displaced as to bring about the desired movements of the locking hook 8.

As will be understood from an inspection of Figs. 1 and 2, the panel 5 includes a panel frame member 14, with which are associated the side walls 15 and 16 of the panel. To the rear face of the frame member 14 there is connected a housing supporting block 17 which is mortised, as shown most clearly in Fig. 2, so as to provide a space 18 adapted for the reception of the housing 7.

As will be understood from an inspection of Figs. 1 and 2, the housing 7 includes a pair of similar body sections 20—20 provided with marginal flanges 21—21 which are adapted to engage each other in a face-to-face relation, the flanges 21—21 being welded, or otherwise suitably connected to each other. As shown most clearly in Fig. 2, the marginal flanges 21—21 are offset with respect to their associated body sections 20 and thus serve to maintain the body sections in a spaced relation to each other so as to accommodate therebetween the translating finger 10, the cross-sectional dimension of which is slightly less than the length of the hub 11 to which that finger is connected.

As will be understood from an inspection of Fig 5, the hub 11 is provided centrally thereof with a hexagonally shaped opening, adapted to receive, as by a slip fit, one end of a hexagonal rod 22, to which is sweated or otherwise fixed a sleeve 24, the outer end of which affords a hexagonal socket 25 adapted for the reception of one end of a well-known type of wrench, which is indicated by the numeral 26 and by which the rod 22 and its associated sleeve 24 may be turned in one direction or the other, as the case may be, so as to move the locking hook 8 from its open position (Fig. 3) to its closed position (Fig. 1) or from its closed position to its open position. The rod 22 and the sleeve 24, as a unit, are held against inward displacement by reason of the fact that the inner end of the sleeve engages the adjacent end of the hub 11, and are held against outward displacement by reason of the fact that the sleeve 24 is cut away, as will be understood from an inspection of Figs. 2 and 5, to provide a shoulder 27 against which abuts the inner end of the tubular portion of a closure cap 28 which embraces the outer end of said sleeve. The closure cap 28, in its entirey, is constructed of a yieldable material, preferably neoprene, and its tubular portion is of such inside dimension that it snugly fits the outer end of the sleeve 24. The outer extending flange portion of the closure cap 28 is formed integral with the tubular portion of that cap and overlies the side wall 16 of the panel 5 to a substantial radial extent. The closure cap 28 is protected from without the panel and is at the same time held against undue displacement axially of itself by the presence of a metal guard ring or housing 29, which is constructed from a suitable material and is held in its overlying position on the flange of the closure cap by ordinary screws as indicated in dotted lines in Fig. 2. Although the closure cap 28 snugly embraces the sleeve 24 so as to afford an adequate seal in the vicinity of the outer end of that sleeve, the tubular portion of the cap is adapted to flex when placed under torsional strain incident to rotation of the sleeve 24 in one direction or the other as the case may be, the torsional action set up within the tubular portion of the closure cap being accounted for by reason of the fact that such portion is in effect locked to the sleeve 24 due to the presence of the flat surface against which the tubular portion of the closure cap intimately engages as shown in Figs. 2 and 5.

In order that the housing 7 may be so anchored in the panel 5 that the hub 11, to which the translating finger 10 is attached, may be maintained in coaxial relation to the tubular portion of the closure cap 28 at all times, the housing body sections 20—20 are provided adjacent the open end of the housing with a pair of laterally extending wings or flanges 30—30, which are let into the outer face of the frame member 14, and are there anchored in place by any suitable means, such as the well-known T-nut type of fasteners 31, shown generally in Fig. 1 in dotted outline. Disposed in an overlying relation to the flanges 30—30 and suitably connected to the outer face of the frame section 14, is a sealing strip 32, which is provided with a slit 34 adapted to accommodate the locking hook 8 at its outer end for movement into and out of its locking position. Preferably the sealing strip 32 is constructed from a suitable plastic, such as neoprene, the marginal portions of the sealing strip adjacent the slit being adapted to intimately engage the opposite faces of the locking hook 8, as shown in Fig. 2, so as to there maintain an effective seal against ingress of air or moisture.

Referring to the panel 6 it may be well to here remark that this panel is similar to the panel 5 hereinbefore described in that it includes a frame member 14' to which the side walls 15' and 16' of the panel are suitably connected. To the outer face of the frame member 14' there is connected a beading strip 35, which extends throughout the vertical extent of the panel 6 and is adapted to be accommodated within a channel formed within the panel 5 and extending throughout the vertical extent thereof, the channel being located intermediate a pair of vertical beading strips 36 carried by the frame member 14 as shown in Fig. 2.

In order that the locking hook 8 may be moved into and out of its position shown in Fig. 1, a circular saw, not shown, is let into the frame member 14' and the beading strip 35, to the depth indicated at 37 in Figs. 1 and 4, so as to provide in the beading strip 35 a vertical slot 38. Referring to Fig. 2, it will be noted that the frame member 14' as well as the beading strip 35, is cut away transversely so as to provide a pocket adapted to receive the horizontally disposed U-shaped portion of a keeper 39, with which the outer end of the locking hook 8 is adapted to engage and cooperate in retaining the panels 5 and 6 in an abutting relation to each other, as shown most clearly in Fig. 2. It is desirable that the keeper 39 be so mounted on the panel 6 that it is permitted to yield slightly under the retracting movement of the locking hook 8, as will hereinafter more clearly appear, and to this end there is provided, intermediate the frame member 14' and the outwardly extending foot portions of the keeper 39, a pair of yieldable pads 40 in the form of washers and constructed from a suitable material, such as neoprene. The keeper 39 is attached to the frame section 14' by any suitable means, such as screws 41 which pass through the foot portions of the keeper, the pads 40 and into the frame section 14', it being understood in this connection that the screw-receiving openings which are formed in the foot portions of the keeper, although not shown herein, are of such diameter with respect to the body diameter of the screws 41 as to permit relative movement as between the screws and the keeper under the retracting action of the locking hook 8.

In order that a sealed condition may be established as between the two panels 5 and 6, the latter is provided along each of its marginal edges adjacent the beading strip 35 with a pair of gaskets 41, preferably constructed of neoprene, the gaskets being secured at their inner margins to the frame member 14' of the panel 6. Although various means for attaching the gaskets 41 to the frame member 14' may be adopted, I prefer to employ binding strips 42, as shown in Fig. 2, which are substantially Z-shaped in cross section and through the foot portions 43 of which are passed ordinary screws 44. These screws which pass through the relatively thin inwardly extending flange portions of the gaskets 41 enter the frame member 14' and serve to draw the binding strips 42 downwardly into impinging engagement with the inner margins of the gaskets, leaving the major portion of these gaskets exposed for engagement with the abutting face of the panel 5, as shown in Fig. 2. Here it is to be noted that the binding strips 42 lie in close contact with the sides of the beading strip 35 and that their inwardly extending flanges intimately engage the outer face of the beading strip. From the nature of the gaskets 41 and their relation to the abutting faces of the panels 5 and 6, it will be understood that when such panels are moved into their locked positions, as shown in Figs. 1 and 2, the space then afforded between adjacent faces of the panels is effectively sealed so as to prevent ingress of air and moisture.

Referring now to the details of construction which characterize the locking hook 8, it will be noted that such hook is provided with a substantially L-shaped opening 45 which may be said to include leg areas which are fared into one another along a cam surface 46 at a point substantially diametrically opposite that point on the boundary of the L-shaped opening 45 at which is provided a relatively shallow notch-like detent 47. The margin of the locking hook 8 is provided with a relatively deep notch 48 which is disposed substantially on the horizontal center line of the locking hook when that hook is in its locking position as shown in Fig. 1. Referring to Figs. 1 and 4, it will be noted that the peripheral margin of the locking hook 8 projects outwardly beyond the notch 48 at the lower edge thereof so as to there provide a shoulder 49, the upper surface of which may be regarded as a continuation of the lower edge wall of the notch 48. Arranged in a cooperative relation to the notch 48 is a stop-and-guide pin 50, which extends transversely of the housing 7 and is anchored at its opposite ends in the body sections 20 of that housing, as shown most clearly in Fig. 2. It is to be noted that the diameter of the pin 50 is such with relation to the width of the notch 48 that said pin is adapted to snugly fit within said notch, as when the locking hook 8 is moved into its locking position shown in Fig. 1. At a point directly beneath the axis of the hub 11, there is disposed a guide pin 51, the opposite ends of which, like those of the pin 50, are anchored in the body sections 20 of the housing 7. Here it will be observed that the curvature of the marginal portion of the locking hook 8 is such that the pin 51 permits the locking hook to move downwardly, in the direction of the arrow B, from its position appearing in Fig. 3 to its position shown in Fig. 4. At such time as the locking hook 8 assumes its position shown in Fig. 4, the shoulder 49 will have engaged the pin 50 and the straight-away edge portion 52 of the locking hook will have assumed a position immediately at the right of the guide pin 51 as shown in Fig. 4. It will be understood that once the locking hook 8 has been moved from its position shown in Fig. 3 to its position shown in Fig. 4, such hook is free to be moved in the direction of arrow A to its fully locked position shown in Fig. 1, it being understood that as the locking hook is displaced horizontally in carrying out the locking operation the straight away edge portion 52 of the locking hook is free to move unobstructedly over the guide pin 51. Here it should be noted that the translating finger 10 is provided at its outer end with a detent hook 54 which conforms substantially to the notch-like detent 47, and that the geometrical relationship as between the substantially L-shaped opening 45 and the contour of the translating finger 10 is such that when said finger moves slightly past center into its biasing position, as shown in Fig. 1, the detent hook 54 will enter the notch-like detent 47 and thus effectively prevent the locking hook 8 from unduly releasing its engagement with its associated keeper 38.

When it becomes desirable to release the locking hook 8 from its position shown in Fig. 1 and thereafter move it to its fully released position shown in Fig. 3, the wrench 26 is inserted in the socket 25, which is provided at the outer end of the sleeve 24, and then turned in a counter-clockwise direction (Fig. 1), thus causing the detent hook 54 to move out of the notch-like detent 47. At or about the instant that the translating finger 10 moves past its horizontal dead center position and into its unbiased position, that edge of the locking hook 8 which is adjacent the cam surface 46 is engaged by the lower edge, reference being had to Fig. 1, of the translating finger 10 with the result that as the translating finger is moved in the direction of the arrow D appearing in Fig. 1, the locking finger 8 is moved horizontally of itself in the direction of the arrow C until such time as the stop-and-guide pin 50 assumes a position directly over the shoulder 49, as shown in Fig. 4. As a result of such displacement of the locking hook 8, the curved surface 55 of the locking hook 8, which blends in with the straight-away edge portion 52 thereof will have assumed a position which is such with relation to the guide pin 51, as shown in Fig. 4, as will permit the locking hook 8 to move upwardly from its position shown in Fig. 4 to its fully open position as shown in Fig. 3. Here it should be noted that the curved surface 55 represents an arc of a circle which is concentric with the hub 11 when the locking hook 8 is positioned as shown in Fig. 4 with the result that the curved surface 55 is free to move unobstructedly over the guide pin 51 as the locking hook 8 is moved from its position shown in Fig. 4 to its position shown in Fig. 3. As the locking hook 8 moves into its fully opened position, reference being had to Fig. 3, the outer end of the locking hook engages and passes under a yieldable retaining stop 56 which becomes slightly compressed at that time under the action of the locking hook so as to permit that hook to move into its fully opened position where it is retained against accidental displacement by reason of the presence of said stop. It will be understood, of course, that when it becomes desirable to move the locking hook 8 from its fully opened position in the direction of the arrow B appearing in Fig. 3, the yieldable stop 56 is again radially compressed to permit the locking hook 8 to move past the same. Preferably, the yieldable stop 56 is fabricated from neoprene and is held in its position intermediate the body sections 20 of the housing 7 by means of a pin or rivet 57 passing through the said sections and suitably anchored thereto.

In view of the foregoing, it is believed that no further discussion of the present embodiment of the invention becomes necessary except possibly to emphasize the fact that the locking hook 8, when being moved from its position shown in Fig. 1 to its position shown in Fig. 4, is so displaced in the direction of the arrow C that the outer end of the translating finger 10 maintains contact with the adjacent vertical edge-wall, reference being had to Fig. 1, of the L-shaped opening 45 until that finger assumes its position shown in Fig. 4, at which time such an interlocking connection is established between the finger and the locking hook 8 that further rotary displacement of said finger will, of necessity, cause the locking hook to rotate about the axis of the hub 11 and thus move into its fully open position shown in Fig. 3. At or about the instant at which the locking hook 8 begins to move from its position shown in Fig. 4 to its fully opened position, the curved edge of the locking hook appearing above the notch 48 in Fig. 1 and there indicated by the numeral 58, is permitted to move unobstructedly past the stop-and-guide pin 50, inasmuch as the curved edge 58 lies on a circle described about the axis of the hub 11 in a concentric relation to that circle on which is disposed the curved surface 55 of the locking hook.

Although only one embodiment of the invention is herein shown and described, it will be understood that various changes with respect to the present embodiment may be made without departing from the invention or the scope of the following claims.

We claim:

1. A latch comprising, a locking member provided with an irregular shaped opening having a pair of leg areas extending one from the other in an angular relation to each other, and having a clearance area at the base of a leg area, a translating finger mounted at one end for rotary movement within said opening and about a definite axis located within said opening, said finger being at all times maintained in cooperative contact with the side walls of said opening and having a lateral projection at its free end receivable in said clearance area, said projection being normally at all times in engagement with a side wall of the said opening, actuating means for rotating said finger about said axis whereby said locking member is moved in a definite path from locking position to an intermediate position and thence to full open position, and restraining means cooperating with said locking member for restricting said locking member throughout a portion of said path to longitudinal displacement and for restricting said locking member to rotary displacement throughout another portion of said path.

2. A latch comprising, a locking member provided with an irregular shaped opening having a pair of leg areas extending one from the other in an angular relation to each other, and having a clearance area at the base of a leg area, a translating finger mounted at one end for rotary movement within said opening and about a definite axis located within said opening, said finger being at all times maintained in cooperative contact with the side wall of said opening and having a lateral projection at its free end receivable in said clearance area, said projection being normally at all times in engagement with a side wall of the said opening, actuating means for rotating said finger about said axis whereby said locking member is moved in a definite path from fully open position into intermediate position and thence into closed position, and restraining means cooperating with said locking member for restricting said locking member to rotary displacement throughout a portion of said path and for restricting said locking member to longitudinal displacement throughout another portion of said path.

3. A latch comprising, a locking member provided with a substantially L-shaped opening having a pair of leg areas extending one from the other in an angular relation to each other, and having a clearance area at the base of a leg area, a translating finger mounted at one end for rotary movement within said opening about a definite axis located within said opening and having a lateral projection at its free end receivable in said clearance area, said projection being normally at all times in engagement with a side wall of the said opening, said finger being located within one of said leg areas during such time as said locking member is maintained in a locked position, and detent means associated in part with said locking member and in part with said translating finger for establishing an interlocking connection between said locking member and said translating finger whereby said locking member is maintained against undue displacement when in locking position.

4. A latch comprising, a locking member provided with a substantially L-shaped opening having a pair of leg areas extending one from the other in an angular relation to each other and having a curved clearance area at the base of a leg area, a translating finger mounted at one end for rotary movement within said opening about a definite axis located within said opening and having a curved lateral projection at its free end receivable in said clearance area, said projection being normally at all times in engagement with a side wall of the said opening, said finger being located within one of said leg areas during such time as said locking member is maintained in a locked position and located within the other of said areas during such time as said locking member is maintained in an unlocked position, detent means associated in part with said locking member and in part with said translating finger for establishing an interlocking connection between said locking member and said translating finger whereby said locking member is maintained against undue displacement when in locking position, and actuating means for rotating said finger about said axis whereby said locking member is moved in a definite path from locking position to an intermediate position and thence to fully open position.

5. A latch comprising, a locking member provided with a substantially L-shaped opening having a pair of leg areas extending one from the other in an angular relation to each other, a translating finger mounted at one end for rotary movement within said opening about a definite axis located within said opening and having a curved lateral projection at its free end receivable in said clearance area, said projection being normally at all times in engagement with a side wall of the said opening, said finger being located within one of said leg areas during such time as said locking member is maintained in a locked position and located within the other of said areas during such time as said keeper and locking member are maintained in an unlocked position, detent means associated in part with said locking member and in part with said translating finger for establishing an interlocking connection between said locking member and said translating finger whereby said locking member is maintained against undue displacement when in locking position, actuating means for rotating said finger about said axis whereby said locking member is moved in a definite path from locking position to an intermediate position and thence to fully open position, and restraining means cooperating with said locking member for restricting said locking member throughout a portion of said path to longitudinal displacement and for restricting said locking member to rotary displacement throughout another portion of said path.

6. A latch comprising, a locking member provided with a substantially L-shaped opening having a pair of leg areas extending one from the other in an angular relation to each other, said locking member presenting at its margin a pin-receiving notch, a straight-away edge, a curved surface and a curved edge, a translating finger mounted at one end for rotary movement within said opening about a definite axis located within said opening and having a curved lateral projection at its free end receivable in said clearance area, said projection being normally at all times in engagement with a side wall of the said opening, said finger being located within one of said leg areas during such time as said keeper and locking member is maintained in a locked position and located within the other of said areas during such time as said locking member is maintained in an unlocked position, detent means associated in part with said locking member and in part with said translating finger for establishing an interlocking connection between said locking member and said translating finger whereby said locking member is maintained against undue displacement when in locking position, actuating means for rotating said finger about said axis whereby said locking member is moved in a definite path from locking position to an intermediate position and thence to full open position, and restraining means cooperating with said locking member for restricting said locking member throughout a portion of said path to longitudinal displacement and for restricting said locking member to rotary displacement throughout another portion of said path, said restraining means including a pair of pins, over one of which said straight-away edge is adapted to move as said locking member is displaced longitudinally of itself and over which said curved surface is adapted to move as said locking member undergoes rotary displacement, the other of said pins being disposed within said notch during such time as said locking member is maintained in locking position and over which said curved edge is adapted to move during rotary displacement of said locking member.

References Cited in the file of this patent

UNITED STATES PATENTS

| Number | Name | Date |
|---|---|---|
| 398,549 | Smith | Feb. 26, 1889 |
| 539,030 | Bitner | May 14, 1895 |
| 1,285,341 | Older | Nov. 19, 1918 |
| 2,291,782 | Allring | Aug. 4, 1942 |
| 2,340,864 | Carpenter | Feb. 8, 1944 |
| 2,378,654 | Pekny | June 19, 1945 |
| 2,581,816 | Schlueter | Jan. 8, 1952 |
| 2,647,287 | Jones | Aug. 4, 1953 |